United States Patent
Turner, Jr. et al.

(10) Patent No.: US 9,850,856 B1
(45) Date of Patent: Dec. 26, 2017

(54) POWER SYSTEM WITH INTERNAL COMBUSTION ENGINE

(71) Applicant: NEXT GENERATION ENGINES LLC, Bonita Springs, FL (US)

(72) Inventors: Alfred A. Turner, Jr., Bonita Springs, FL (US); Edmond Eugene McCrickard, Franklin, TN (US); Thomas Lee Roberts, III, Ventura, CA (US)

(73) Assignee: NEXT GENERATION ENGINES LLC, Bonita Springs, FL (US)

( * ) Notice: Subject to any disclaimer, the term of this patent is extended or adjusted under 35 U.S.C. 154(b) by 0 days.

(21) Appl. No.: 15/622,691

(22) Filed: Jun. 14, 2017

Related U.S. Application Data

(63) Continuation-in-part of application No. 15/279,237, filed on Sep. 28, 2016, now abandoned, and a
(Continued)

(51) Int. Cl.
*F02B 47/02* (2006.01)
*F02M 25/10* (2006.01)
(Continued)

(52) U.S. Cl.
CPC ............. *F02M 25/10* (2013.01); *F02D 7/02* (2013.01); *F02D 33/003* (2013.01); *Y02T 10/121* (2013.01)

(58) Field of Classification Search
CPC ..... Y02T 10/121; F02D 41/402; F02D 41/26; F02D 7/02; F02D 33/003; F02M 23/00; F02M 23/04; F02M 25/12; F02M 25/10; F02M 35/10334; F02M 53/02; F02M 2023/008; F02B 47/06; F02B 75/02; F02B 75/04; B01D 53/228; B01D 63/02; B01D 69/08; B01D 71/02; F01L 1/06; F01L 7/02
(Continued)

(56) References Cited

U.S. PATENT DOCUMENTS 3,961,602 A  6/1976  Gerry
3,961,609 A  6/1976  Gerry
(Continued)

OTHER PUBLICATIONS

International Search Report & Written Opinion dated Aug. 22, 2017—PCT/US2017/037751—Jun. 15, 2017.
(Continued)

*Primary Examiner* — Hai Huynh
*Assistant Examiner* — Gonzalo Laguarda
(74) *Attorney, Agent, or Firm* — Karish & Bjorgum, PC

(57) ABSTRACT

A power system including a variable volume combustion chamber for a two-stroke engine having a controlled exhaust port, a fuel injector to the combustion chamber and an oxygen injector to the combustion chamber. The oxygen injector provides repeated oxygen injection pulses to complete a charge. The controlled exhaust port includes an oscillating rotatably mounted valve. A source of pressurized concentrated oxygen to the oxygen injector is in a closed case having a ceramic fiber membrane. An air inlet and a waste outlet are in communication with a first side of the ceramic fiber membrane. An oxygen outlet is in communication with a second side of the ceramic fiber Ionic transport membrane. The case has a heat transfer surface in communication with the controlled exhaust port from the combustion chamber.

16 Claims, 4 Drawing Sheets

Related U.S. Application Data continuation-in-part of application No. 15/184,120, filed on Jun. 16, 2016, now abandoned.

(51) Int. Cl.
*F02D 7/02* (2006.01)
*F02D 33/00* (2006.01)

(58) Field of Classification Search
USPC .......... 123/585, 567, 539, 536, 3, 1 A, 302, 123/299–300
See application file for complete search history.

(56) References Cited

U.S. PATENT DOCUMENTS

| | | |
|---|---|---|
| 4,189,914 A | 2/1980 | Maarek et al. |
| 4,244,338 A | 1/1981 | Rassey |
| 5,267,535 A | 12/1993 | Luo |
| 6,516,787 B1 | 2/2003 | Dutart et al. |
| 8,479,690 B2 | 7/2013 | Maro et al. |
| 8,511,287 B2 | 8/2013 | Hofbauer et al. |
| 8,925,518 B1 | 1/2015 | Riley |
| 2002/0104518 A1 | 8/2002 | Keefer |
| 2007/0266995 A1 | 11/2007 | Ha et al. |
| 2008/0223332 A1 | 9/2008 | Maro |
| 2010/0107994 A1 | 5/2010 | Moriarty |
| 2013/0037003 A1 | 2/2013 | Sheerin et al. |
| 2015/0260131 A1 | 9/2015 | Riley |

OTHER PUBLICATIONS ceramatec.com—"Solid Electrolyte Oxygen Separation"—Jan. 29, 2015 (3 pgs.).

airproducts.com News Release "Air Products Breaks Ground on Louisiana ITM Oxygen Production Test Facility", Sep. 14, 2011, Lehigh Valley, PA (3 pgs.).

Article, "Japanese Tornadoes", Jan. 9, 2015 (p. 1, ¶ 2).

POWER SYSTEM WITH INTERNAL COMBUSTION ENGINE

RELATED APPLICATION

This is a continuation-in-part of U.S. patent application Ser. No. 15/279,237, filed Sep. 28, 2016, which is a continuation-in-part of U.S. patent application Ser. No. 15/184,120, filed Jun. 16, 2016, the disclosures of which are incorporated herein by reference.

BACKGROUND OF THE INVENTION

The field of the present invention is power systems employing alternatively aspirated internal combustion engines.

Power systems using internal combustion engines, particularly for powering vehicles and craft have mixed fuel with air containing oxygen drawn into variable volume cylinders for combustion. Such systems advantageously do not require the fuel oxidizer to be carried around with the system. However, the use of air dilutes the oxidizer-fuel charge and entrains nitrogen into the combustion process resulting in unwanted oxides of nitrogen. Because the oxidizer is diluted, such engines also must deal with large volumetric flow through the engine including the substantial nonproductive air components, impacting design and operation. Concentrated oxygen has been contemplated for use in engines. Reference is made to U.S. Pat. No. 3,961,609 to Gerry and U.S. Pat. No. 8,479,690 to Maro et al., the disclosures of which are incorporated herein by reference.

SUMMARY OF THE INVENTION

The present invention is directed to a power system employing an internal combustion engine, a source of fuel and a source of concentrated oxygen. By using concentrated oxygen under pressure, the system can accommodate oxygen being introduced by an injector. Such operation allows for greater control of burn rate and oxygen-fuel ratios of the charge through pulses in seriatim of each of fuel and oxygen. Complications resulting from other constituents of air including air pollution can be diminished or avoided; and overall engine and vehicle efficiency can provide a substantial increase in fuel economy.

In a preferred embodiment, a source of concentrated oxygen includes an oxygen separator. The separator separates oxygen from other constituents of air. Ionic transport membranes form one category of such devices which are applicable for mobile and stationary use with an engine. The preferred embodiment employs a ceramic fiber membrane doped with perovskits or fluorites in a closed case. Such devices have the capability of producing oxygen with a purity of 99.995%. Ionic transport membrane devices are typically advantaged for efficient operation by elevated temperatures and pressures. The case enclosing such a membrane is arranged in a heat transfer relationship with the engine exhaust and with compressed air feed to maintain an appropriate environment for operation of the membrane. Other devices may be used which are less capable of such purity but adequately concentrate oxygen to attain sufficient volumetric efficiency to make oxygen injection practical and advantageous and to significantly avoid exhaust pollutants.

Also in a preferred embodiment, the source of concentrated oxygen includes an oxygen reservoir to receive the oxygen output from the membrane before it is passed to the oxygen injector. The reservoir is a tank of sufficient size to accommodate fluctuations in both productions to and usage from the reservoir. Further, oxygen may be accumulated in the tank during operation of the system to be used for purposes of restart when the conditions in the membrane do not admit of efficient concentrated oxygen production.

The density of the concentrated oxygen from the source can be increased beyond that which can be supplied by efficient operation of the ceramic membrane. Further pump compression after the oxygen separator as well as intercooling can increase the quantity of concentrated oxygen per unit volume to the engine. Refrigeration of the oxygen reservoir can also be used to the same end.

The reduced volumetric flow through the engine and employment of an oxygen injector provide the advantageous employment of an internal combustion engine having a cycle completed in two strokes of the piston. The engine is able to complete fuel and oxygen introduction and combustion during the down stroke and substantially complete scavenging of combusted products with the subsequent upstroke in the two-stroke cycle. The introduction of the components of combustion is accomplished with the injectors. The exhausting of the combusted components is accomplished with a controlled exhaust port which can be fully closed during the power stroke.

Further aspects of the present invention may also enhance combustion in the contemplated power system. The fuel and oxygen injectors can be controlled by an ECU to provide power commensurate with the demand and to maintain an appropriate fuel-oxygen ratio of the accumulated final charge.

In a further aspect of the present invention, a rotary valve may be employed to control the exhaust port from each combustion chamber. With offset cam drive, the cylindrical exhaust valve may oscillate rather than rotate to directly and easily control opening and closing. Opening of the exhaust port may also begin when most advantageous to maximize scavenging with minimal impact to the power stroke. As fuel and oxygen are injected, closure of the exhaust valve is understood to have little impact on charging and can be closed when advantageous, including after TDC.

Accordingly, it is a principal object of the present invention to provide an improved power system using an internal combustion engine. Other and further objects and advantages will appear hereinafter.

DETAILED DESCRIPTION OF THE PREFERRED EMBODIMENT

Turning in detail to the system illustrations, a power system is illustrated with power provided by an internal combustion engine 10 employing a cycle completed in two strokes. The engine 10 is illustrated to be a 90° V4 with a conventional block, crankshaft, pistons, connecting rods and rotary power output equipment. A conventional belt-drive off the crankshaft is arranged to drive a cooling water pump, an alternator and an air compressor. A conventional timing belt drives an exhaust port cam and a water pump. Exhaust manifolds 12 extend directly out of heads 14 to accumulate exhaust in a collector 16 defining a single exhaust outlet.

Figure 1:
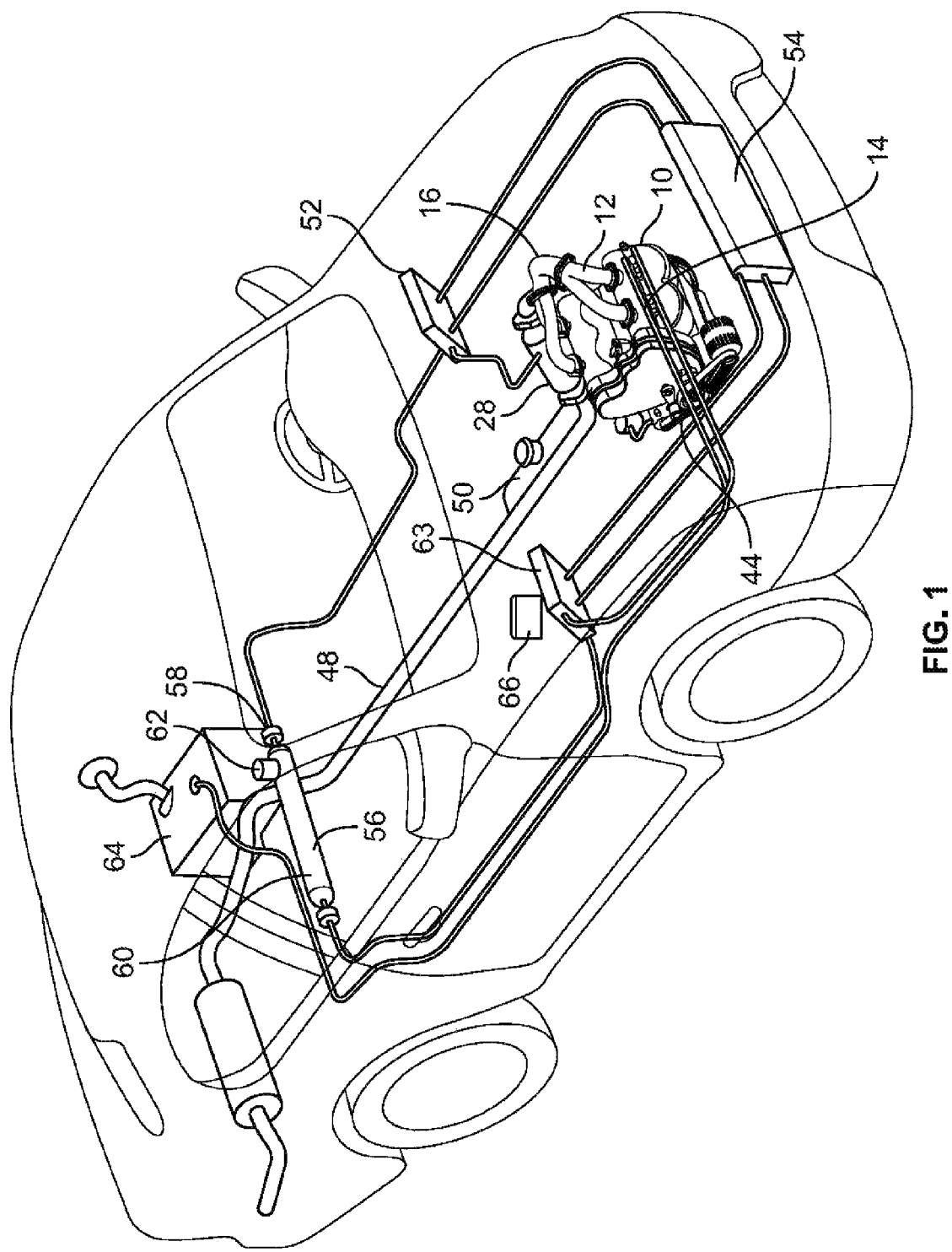
FIG. 1 is an illustrative system view of a power system as may be employed in a vehicle.
Figure 2:
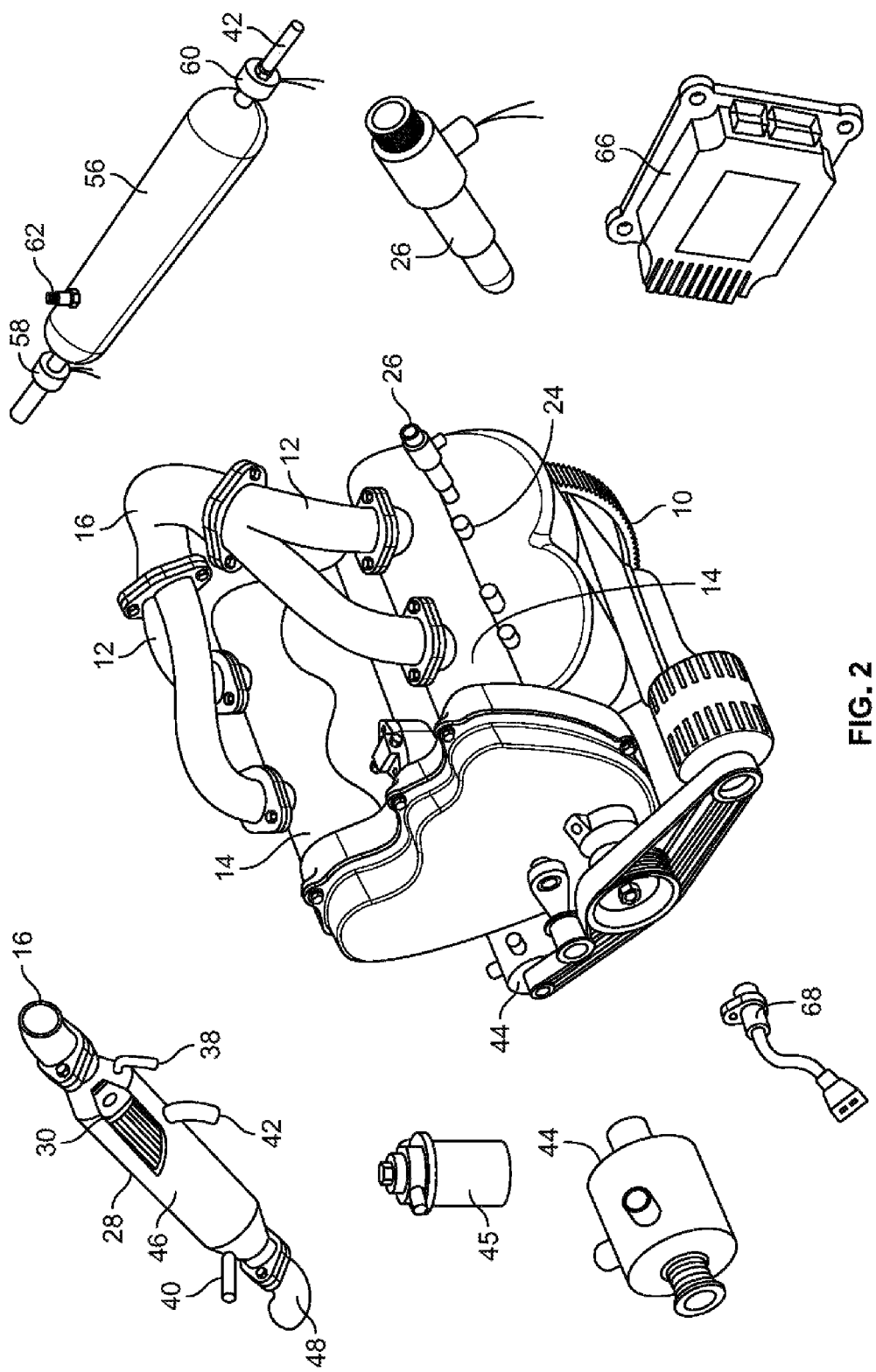
FIG. 2 is an illustrative system view of system components of the source of pressurized concentrated oxygen associated with an internal combustion engine.
Figure 3:
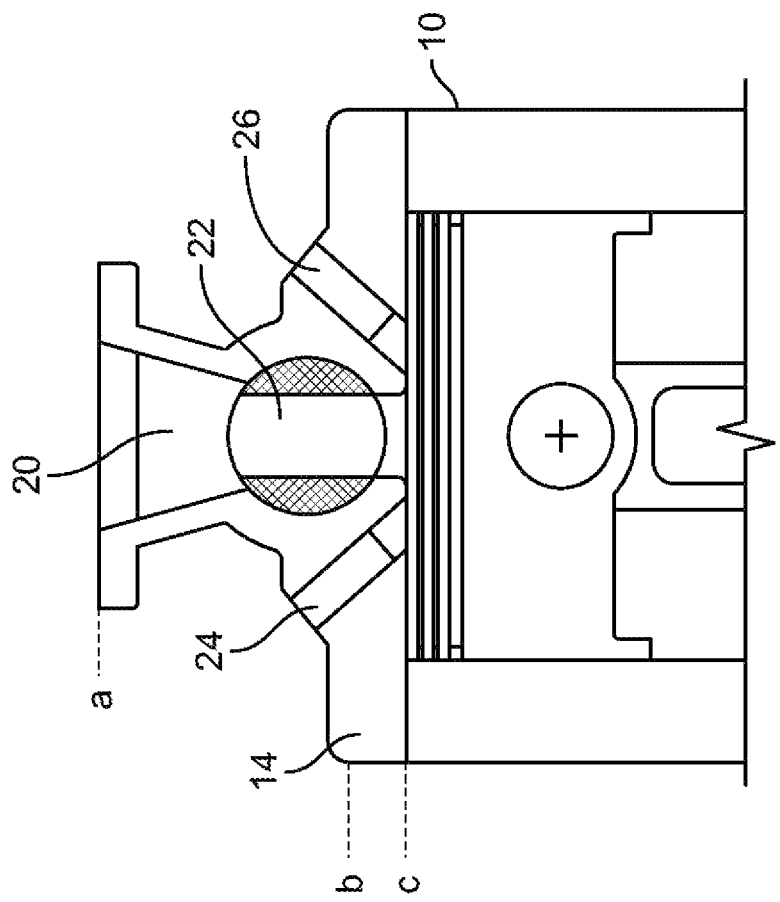
FIG. 3 is a schematic cross-sectional view of a variable volume combustion chamber with a cylinder, a head and a reciprocating piston.
Figure 3:
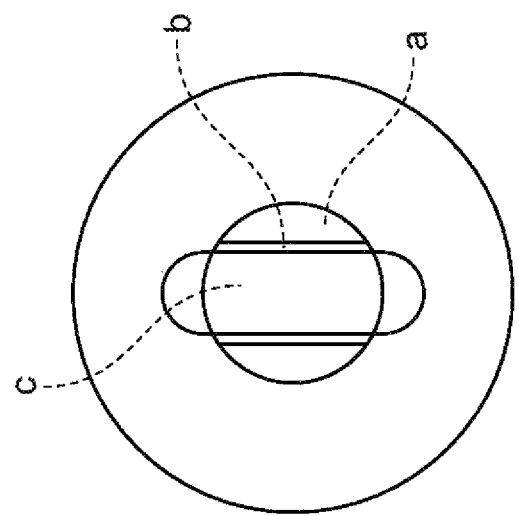

The arrangement of the heads 14 associated with the combustion chambers is illustrated in FIG. 3. Each variable volume combustion chamber 18 includes a portion of the head 14 having a controlled exhaust port 20 with a rotatably mounted valve 22 controlling the port. FIG. 3 illustrates a cross section through the port 20 and a schematic diagram with flow areas at elevations a, b and c. A fuel injection system 24 extends to the combustion chamber while an oxygen injection system 26 is conveniently located to the other side of the controlled exhaust port 20 to also extend to the combustion chamber. The exact arrangement and orientation of the injectors of the injection systems 24, 26 are typically empirically determined for each combustion chamber configuration. The fuel injection system 24 and oxygen injection system 26 are conventional products readily acquired, each most typically including a common rail distribution system with a piezoelectric injector 24, 26 at each combustion chamber and electronically controlled by an ECU 66 that is timed by a crankshaft position sensor 68, a direct injection pump cam sensor and an exhaust valve cam shaft sensor.

Figure 4:
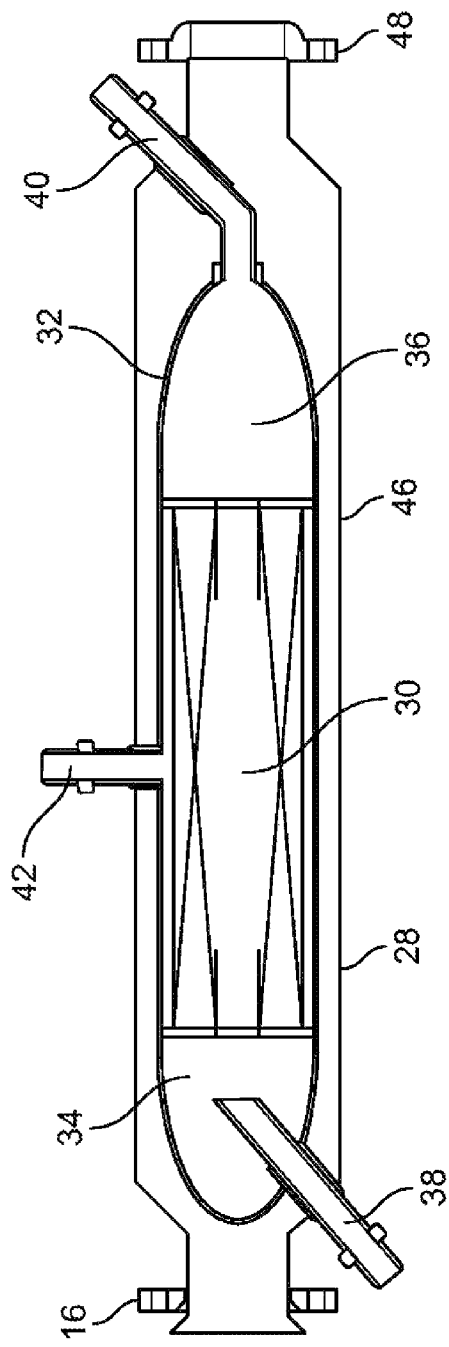
FIG. 4 is a schematic system illustration of an oxygen separator.
Figure 6:
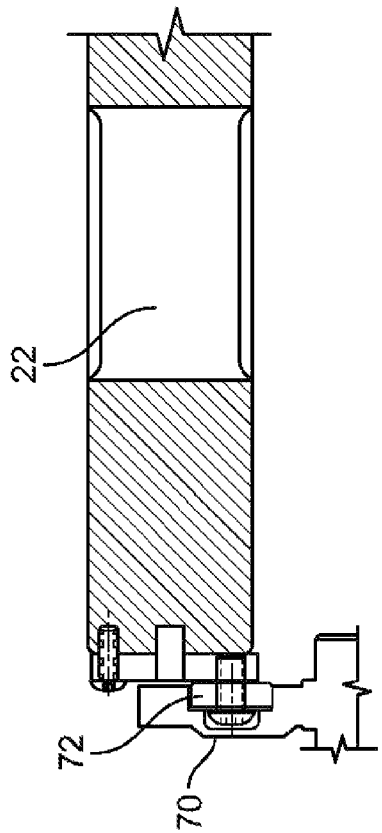
FIG. 6 is a schematic illustration of the cam drive of FIG. 5.
Figure 5:
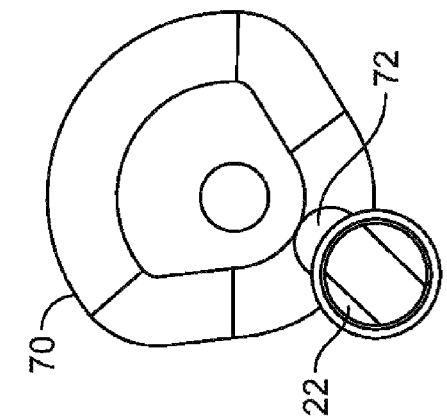
FIG. 5 is a schematic illustration of a cam drive for the rotary valve of FIG. 3.

A source of concentrated oxygen includes an oxygen separator 28 illustrated in FIG. 4. The oxygen separator 28 in the preferred embodiment is of a type including a membrane 30 doped with perovskits or fluorites in a closed case 32. The closed case 32 has the membrane 30 centrally located within the case with cavities 34, 36 to either side thereof. The membrane is shown to be a ceramic hollow fiber membrane which extends the length between cavities allowing restricted flow therethrough. An air inlet 38 is in communication with the first side of the membrane 30 via the cavity 34. This first side of the membrane constitutes the passages through the hollow fibers. The case 32 also includes a waste outlet 40 also in communication with the first side of the membrane 30. Finally, the case 32 includes an oxygen outlet 42 which is in communication with the second side of the membrane. The second side of the membrane is on the outside of the fibers.

The operating conditions of such oxygen separators typically include a differential pressure across the membrane of 10 to 90 bar and temperatures ranging from 700 to 900° C. To achieve such pressure differentials, the air inlet 38 is in communication with an air compressor 44. Such an air compressor 44 is shown to be belt-driven by the engine 10 to achieve operating pressures for the oxygen separator 28. A conventional water, oil and particle separator(s) 45 after the air compressor 44 protects the membrane 30. Alternatively, such membranes may operate best if a differential pressure thereacross is achieved by reducing pressure downstream of the membrane. If correct, the air inlet 38 would lead to the first side of the membrane 30 through the particle separator 45. The air compressor 44 would, instead, be a vacuum pump coupled with the oxygen outlet 42. It may be driven by the engine as was the air compressor 44. The outlet from the vacuum pump may still also act to boost pressure to the downstream components further discussed to provided pressurized oxygen to the engine injection system.

To achieve such temperatures, a heat transfer association between the case 32 and the exhaust is used in addition to compressional heating by the air compressor 44 to provide a source of heat energy from the engine. In the preferred embodiment, a sleeve conduit 46 is arranged about the closed case. The sleeve conduit 46 is directly coupled with the exhaust collector 16 such that exhaust will flow around the closed case for heat transfer from the exhaust to the air flow into and through the ceramic membrane. The sleeve conduit 46 is also in communication with an exhaust pipe 48 to direct minimally restricted exhaust away from the equipment. The case 32 is preferably of thermally highly conductive material such as metal and may contain heat transfer enhancements such as fins, baffles or the like. More elaborate heat transfer devices may be used to increase heat transfer between the exhaust and the compressed air including alternate flow arrangements. The exhaust may also be directed centrally through the core of the ceramic membrane 30 to enhance heat transfer. Other heating sources may be used to accelerate and/or augment heating of the oxygen separator 28 or the incoming compressed air In considering various devices available in the art to be included here in the use of the phrase "oxygen separator", air is considered to be principally made up of molecules of nitrogen and oxygen, accounting for approximately 99 mole percent, in a ratio of 78 N2 to 21 O2. The task may thus be considered one of separating oxygen and nitrogen to achieve a sufficient concentration of oxygen for volumetrically efficient engine operation. A useful concentration of oxygen may be obtained by a significant removal of nitrogen alone from air, whether the technology is principally considered to be separating oxygen from air or nitrogen from air. Thus, oxygen separators in addition to the oxygen separator 28 of the preferred embodiment are included here, devices which concentrate oxygen to attain sufficient volumetric efficiency to make oxygen injection practical and advantageous and to meet clean air standards without requiring exhaust catalytic conversion of oxides of nitrogen. The more limiting is the avoidance of oxides of nitrogen. An oxygen separator system which removes nitrogen from air to generate a gas stream therefrom that is at least 98 mole percent oxygen is sufficient to achieve these benefits.

Each of known membrane technologies, which include fiber membranes, hollow fiber membranes and solid electrolyte oxygen separation, and known pressure and vacuum swing technologies may be appropriated for oxygen separation in the source of concentrated oxygen to the engine. Such oxygen separators are preferably operated where most efficient, whether at high pressure and temperature or low. Generally, an air compressor 44 is to be used to properly charge the oxygen separator. Further boost to injection pressure may be accomplished with a gas compressor associated with the injector system. The choice of such known technologies and devices may depend on the type of vehicle or craft or stationary power source contemplated.

Returning to the preferred embodiment, to ensure that the appropriate working pressure in the case 32 is not exceeded, the waste outlet 40 is restricted by a conventional waste gate 50. The waste gate 50 is set at a predetermined pressure to maintain the closed case 32 in an efficient pressure range. Relief above a predetermined pressure through the waste gate 50 is permitted to flow to the exhaust pipe 48.

The source of pressurized concentrated oxygen from air provides a stream from the ceramic fiber membrane 30 through the oxygen outlet 42 which is at least 98 mole percent oxygen. The pressurized concentrated oxygen is shown in the preferred embodiment to first be directed to an intercooler 52 to cool the oxygen, increasing oxygen density. The intercooler 52 may be conveniently water cooled by a radiator 54 as may be available on a vehicle. Further gas pressure can also be obtained after the oxygen outlet 42 by a gas compressor which may be independent or a separate compressor component stage in the air compressor 44 (communication lines not shown) driven in either case directly or indirectly by the engine 10. For better efficiency, gas compression would appropriately be followed by gas cooling. The concentrated oxygen at a preferred pressure is then directed to an oxygen tank 56.

The oxygen tank 56 preferably has the capacity to maintain a sufficient volume of concentrated and pressurized oxygen to provide starting and warmup for the engine and ceramic fiber membrane 30 from a cold start. Additionally, the capacity of the oxygen tank 56 accommodates fluctuations in increased engine demand and variations in the output of the oxygen separator 28.

An inlet regulator 58 and an outlet regulator 60 are arranged at the inlet and outlet of the oxygen tank 56, respectively. The outlet regulator 60 maintains a constant pressure for discharging concentrated and pressurized oxygen to the oxygen injectors 26. The inlet regulator 58 prevents backflow toward the ceramic fiber membrane 30 and provides a maximum pressure signal if the oxygen tank becomes over pressurized. A primer valve 62 provides access to the oxygen tank 56 for additional charging. A further increase in density of the concentrated oxygen for volumetric efficiency may be additionally or alternatively provided by an intercooler 63 between the oxygen tank 56 and the engine 10. Such an intercooler 63 may be thermally coupled with the radiator 54 or otherwise cooled. The intercooler 63 may be paired with a compressor, again, independent or a separate compressor component stage in the air compressor 44 (communication lines not shown) driven in either case by the engine 10. Alternatively or additionally, refrigeration of the oxygen tank 56 may be employed toward the same end.

Fuel to be delivered to the fuel injectors 24 is maintained in an appropriate fuel tank 64. A low pressure pump having conventional 50 to 60 psi capacity (not shown) is associated with the fuel tank 64. The fuel injection system is also conventional, most typically a common rail distribution system including a high pressure direct injection fuel pump boost 2900 psi. Conventional piezoelectric injectors 24 at each combustion chamber are fed by the distribution system and electronically controlled by the ECU 66 timed by a crankshaft position sensor 68, a direct injection pump cam sensor and an exhaust valve cam shaft sensor.

The rotatably mounted valve 22 in the exhaust port 20 is controlled by a cam 70 rotatably mounted to the engine 10 and driven by the crankshaft. The valve 22 is driven to oscillate through offset cam drive gearing coupled to the cam follower 72. The cross section of the port 20 is illustrated fully open in FIG. 3.

The operation of the power system is preferably controlled by the electronic control unit 66. Such units are commonly employed to regulate various vehicle engine operations. The ECU 66 can monitor pressures and temperatures throughout the system and may receive the over-pressure signal from the inlet regulator 58 on the oxygen tank 56. Further, the ECU 66 may appropriately engage or disengage an electric clutch drive or drives on the air compressor 44 to maintain pressure in the oxygen tank 56 and elsewhere within appropriate boundaries. The ECU 66 further can monitor throttle input from a vehicle and modulate fuel and oxygen to the combustion chambers through conventional control of the injectors 24, 26. This modulation, typically based on mapped fuel curves, provides control of engine power and at the same time achieve a final charge from the accumulated pulses maintaining an appropriate oxygen-fuel ratio charge through the power stroke. The ECU 66 can typically measure optimized performance of the engine and any associated vehicle. The crankshaft position sensor 68 is one such device providing input to the ECU 66 for engine control along with a direct injection pump cam sensor and an exhaust valve cam shaft sensor, determining injector timing and control.

Turning to operation of the two stroke cycle, the rotary valve 22 is mechanically coupled with the crankshaft of the engine through the cam 70 to oscillate back and forth between an open position and a closed position. Efficient motion of the rotary valve 22 is in a range of about 75 to 90 degrees of arc. The drive for the rotary valve 22 may be configured to open the exhaust port 20 as early as shortly before BDC and close the exhaust port 20 at or after TDC. Adequate scavenging of exhaust is not understood to be an issue. In the preferred embodiment, the exhaust port begins to open at 172° after TDC, is fully open at 199° after TDC, starts to close at 329° after TDC and is fully closed at from 12° to 30° after the next TDC. Opening of the exhaust port may also begin when most advantageous to maximize scavenging with minimal impact to the power stroke. Full closure at 14° after TDC provides relatively complete scavenging. However, later closure allows reentry of some exhausted gasses which can assist in initiating combustion.

The injectors are controlled by the ECU 66. The fuel injection system 24 does not need to inject fuel to each combustion chamber before the exhaust valve 22 is closed. In a preferred embodiment, the ECU 66 controls the fuel injectors 24 to initiate injection at from 12° to 30° after top dead center. The fuel is introduced as a plurality of pulses. If liquid hydrocarbons are the fuel, they may be introduced under a conventional 2900 psi pressure. Fuel may be pre-conditioned through heating. Reference is made to U.S. Pat. No. 8,511,287 to Hofbauer et al., the disclosure of which is incorporated herein by reference.

With fuel injected into a given combustion chamber, the ECU 66 initiates oxygen injection through the associated injector 26. The oxygen injection is with the concentrated oxygen at 90 bar and at a temperature lowered from that generated by the prior compression. The intention is to achieve an acceptable total charge to the cylinder during the combustion stroke. Ambient oxygen temperature prior to injection is most convenient if a fixed temperature is to be maintained. Refrigeration may also be employed to increase total efficiency. The oxygen injectors 26 operate through a series of pulses which provide controlled oxidation of the fuel over a period of time corresponding with injection pulses of the fuel with both oxygen and fuel pulses terminating no earlier than the point of maximum crank leverage. In the current preferred embodiment, the point of maximum crank leverage is at 77° after TDC. Conditions of the burn suggest further advantage to extend charging beyond the maximum crank leverage to as late as 90° after TDC. Timing of fuel and oxygen injections can be varied depending on the performance desired. Injection for a cooler and cleaner burn may require different timing than injection for maximum power. Spontaneous or induced ignition may also impact injection and exhaust port timing. With completion of the fuel and oxygen injection in a given stroke, the accumulated ratio of oxygen-fuel injected should be at least at a stoichiometric oxygen-fuel ratio or leaner. With such a ratio, the exhaust should only contain carbon dioxide, water, and potentially some remaining oxygen. If the concentrated oxygen is less than pure, unreactive components will also be present. The oxygen purity as to residual nitrogen is to be sufficient to not require catalytic removal of oxides of nitrogen to meet federal vehicle standards; and "concentrated oxygen" is defined for purposes here to mean that which will meet this requirement. A concentration of 98 mole percent oxygen in the stream to the injectors 26 extracted from the air processed through the oxygen separator 28 is understood to meet this requirement.

With the fuel and oxidizer timed and presented, timed ignition is not believed to be required. Depending on conditions in the combustion chambers and of the entering fuel, spontaneous combustion can occur. A diesel engine type glow plug system is contemplated to insure ignition at start-up or if required for intended operating conditions. Conventional spark ignition systems may also be employed. In two-stroke operation, charge stratification through injector location and spark timing can also be used to insure ignition.

Thus, an improved, efficient and clean burning power system has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A power system comprising
a variable volume combustion chamber;
a controlled exhaust port from the combustion chamber;
a fuel injector system including at least one fuel injector directed to the combustion chamber;
a source of fuel constructed and arranged to charge the fuel injector system with fuel;
an oxygen injector system including at least one oxygen injector directed to the combustion chamber;
a source of pressurized oxygen constructed and arranged to charge the oxygen injector system with oxygen, the source of pressurized oxygen including an oxygen separator constructed and arranged to separate oxygen from air and an air intake to the oxygen separator, the at least one fuel injector and the at least one oxygen injector being the sources of a cumulative stoichiometric or leaner combustible charge to the variable volume combustion chamber, the fuel injector system and the oxygen injector system each providing multiple injection pulses into the combustion chamber in seriatim with completion of the stoichiometric or leaner charge at or after maximum crank leverage.

2. The power system of claim 1, the pressurized oxygen provided by the source of pressurized oxygen being at or greater than 98 mole percent.

3. The power system of claim 1, injection timing of the fuel injector system and oxygen injector system being initiated after TDC of the variable volume combustion chamber.

4. The power system of claim 3, injection timing of the fuel injector system and oxygen injector system being initiated at or after 12° after TDC of the variable volume combustion chamber.

5. The power system of claim 1 further comprising
an ECU including a throttle input, modulation of the fuel injection pulses through the fuel injector system based on the throttle input and a proportional modulation of the oxygen injection pulses to cumulatively complete the stoichiometric or leaner charge.

6. The power system of claim 1 further comprising
an oxygen tank including a constant pressure outlet regulator in communication with the oxygen injector system and a maximum pressure inlet regulator in communication with the source of pressurized oxygen.

7. The power system of claim 1, the source of pressurized concentrated oxygen further including an air compressor powered by the power system and being between the air intake and the oxygen separator and a source of heat energy from the power system to heat the air at the oxygen separator.

8. The power system of claim 1, the controlled exhaust port including a rotary valve with a port therethrough and an offset cam drive to oscillate the rotary valve across the port.

9. The power system of claim 1, the at least one fuel injector being a single piezoelectric fuel injector and the at least one oxygen injector being a single piezoelectric oxygen injector.

10. A power system comprising
a variable volume combustion chamber including a reciprocating piston;
a cycle which occurs in two strokes of the piston defining a TDC and a BDC;
a controlled exhaust port from the combustion chamber;
a fuel injector system including at least one fuel injector directed to the combustion chamber;
a source of fuel constructed and arranged to charge the fuel injector system with fuel;
an oxygen injector system including at least one oxygen injector directed to the combustion chamber;
a source of pressurized oxygen constructed and arranged to charge the oxygen injector system with oxygen at or greater than 98 mole percent, the source of pressurized oxygen including an oxygen separator constructed and arranged to separate oxygen from air and an air intake to the oxygen separator, the at least one fuel injector and the at least one oxygen injector being the sources of a cumulative stoichiometric or leaner combustible charge to the variable volume combustion chamber, the fuel injector system and the oxygen injector system each providing multiple injection pulses into the combustion chamber in seriatim being initiated with ignition at or after 12° after TDC, the completion of the stoichiometric or leaner charge being at or after maximum crank leverage.

11. The power system of claim 10, the exhaust port opening at or before BDC and closing at or after TDC.

12. The power system of claim 10 further comprising
an ECU including a throttle input, modulation of the fuel injection pulses through the fuel injector system based on the throttle input and a proportional modulation of the oxygen injection pulses to cumulatively complete the stoichiometric or leaner charge.

13. The power system of claim 10 further comprising
an oxygen tank including a constant pressure outlet regulator in communication with the oxygen injector system and a maximum pressure inlet regulator in communication with the source of pressurized oxygen.

14. The power system of claim 10, the source of pressurized concentrated oxygen further including an air compressor powered by the power system and being between the air intake and the oxygen separator and a source of heat energy from the power system to heat the air at the oxygen separator.

15. The power system of claim 10, the controlled exhaust port including an oscillating rotatably mounted valve.

16. The power system of claim 10, the at least one fuel injector being a single piezoelectric fuel injector and the at least one oxygen injector being a single piezoelectric oxygen injector.

\* \* \* \* \*